United States Patent [19]
Bodson et al.

[11] Patent Number: 5,847,841
[45] Date of Patent: Dec. 8, 1998

[54] MIXED-MODE SYMBOL REMOVAL FOR FACSIMILE DATA COMPRESSION

[75] Inventors: Charles D. Bodson, Arlington, Va.; Alan R. Deutermann, Huntington Valley, Pa.

[73] Assignee: United States of America, Washington, D.C.

[21] Appl. No.: 780,262

[22] Filed: Jan. 9, 1997

[51] Int. Cl.⁶ .............................. H04N 1/41; H04N 1/40; G06K 9/40
[52] U.S. Cl. ........................... 358/426; 358/470; 382/239
[58] Field of Search ................. 358/261.3, 426, 358/462, 261.1, 429, 432, 433, 470, 430; 382/239, 176, 180

[56] References Cited

U.S. PATENT DOCUMENTS

| | | | |
|---|---|---|---|
| 3,980,809 | 9/1976 | Cook | 358/433 |
| 4,047,228 | 9/1977 | Yagishita et al. | 358/261.1 |
| 4,410,916 | 10/1983 | Pratt et al. | 358/433 |
| 4,494,150 | 1/1985 | Brickman et al. | 358/261.1 |
| 4,499,499 | 2/1985 | Brickman et al. | 358/433 |
| 4,703,362 | 10/1987 | Deutermann et al. | 358/426 |
| 4,797,739 | 1/1989 | Tanaka | 358/433 |
| 5,432,620 | 7/1995 | Watanabe et al. | 358/462 |
| 5,610,995 | 3/1997 | Zheng et al. | 382/183 |
| 5,727,083 | 3/1998 | Kelly et al. | 358/261.3 |

*Primary Examiner*—Kim Yen Vu
*Assistant Examiner*—Kimberly A. Williams
*Attorney, Agent, or Firm*—Defense Information Systems Agency; Flayo O. Kirk

[57] ABSTRACT

A method for data compression provides for an improved digital facsimile document transmission system. The mixed mode method provides that symbols can be located both individually and as a part of a line of symbols in order to provide for efficient operation for both the symbol and graphic portions of a document to be transmitted without requiring that the symbols be organized in lines or that each location be conveyed independently of all other locations of symbols.

5 Claims, 4 Drawing Sheets

THE SLEREXE COMPANY LIMITED
SAPORS LANE - BOOLE - DORSET - BH 25 8 ER

TELEPHONE BOOLE (945 13) 51617 - TELEX 123456

```
OUR REF. 350/PJC/EAC                              18TH JANUARY, 1972.

DR. P.N. CUNDALL,
MINING SURVEYS LTD.,
HOLROYD ROAD,
READING,
BERKS.

DEAR PETE,

PERMIT ME TO INTRODUCE YOU TO THE FACILITY OF FACSIMILE
TRANSMISSION.

IN FACSIMILE A PHOTOCELL IS CAUSED TO PERFORM A RASTER SCAN OVER
THE SUBJECT COPY.  THE VARIATIONS OF PRINT DENSITY ON THE DOCUMENT
CAUSE THE PHOTOCELL TO GENERATE AN ANALOGOUS ELECTRICAL VIDEO SIGNAL.
THIS SIGNAL IS USED TO MODULATE A CARRIER, WHICH IS TRANSMITTED TO A
REMOTE DESTINATION OVER A RADIO OR CABLE COMMUNICATIONS LINK.

AT THE REMOTE TERMINAL, DEMODULATION RECONSTRUCTS THE VIDEO
SIGNAL, WHICH IS USED TO MODULATE THE DENSITY OF PRINT PRODUCED BY A
PRINTING DEVICE.  THIS DEVICE IS SCANNING IN A RASTER SCAN SYNCHRONISED
WITH THAT AT THE TRANSMITTING TERMINAL. AS A RESULT, A FACSIMILE
COPY OF THE SUBJECT DOCUMENT IS PRODUCED.

PROBABLY YOU HAVE USES FOR THIS FACILITY IN YOUR ORGANIZATION.

YOURS SINCERELY,

Phil.

P.J. CROSS
                                        GROUP LEADER - FACSIMILE RESEARCH
```

REGISTERED IN ENGLAND: NO. 2038
REGISTERED OFFICE: 60 VICARA LANE, ILFORD, ESSEX.

*FIG. 1*

THE SLEREXE COMPANY LIMITED
SAPORS LANE - BOOLE - DORSET - BH 25 8 ER

*Phil.*

REGISTERED IN ENGLAND: NO. 2038
REGISTERED OFFICE: 60 VICARA LANE, ILFORD, ESSEX.

MESSAGE COMPOSITION
SYMBOL REMOVAL/HYBRID

| SCAN LINE | SYM PRES | | | | | | | |
|---|---|---|---|---|---|---|---|---|
| 201 | 0 | G | | | | | | |
| 202 | 0 | G | | | | | | |
| 203 | 0 | G | | | | | | |
| 204 | 0 | G | | | | | | |
| 205 | 1 | HPOS | S | S | S | EOSL | G | |
| 206 | 0 | G | | | | | | |
| 207 | 1 | HPOS | S | S | EOSS | HPOS | S | EOSL | G |
| 208 | 0 | G | | | | | | |
| 209 | 0 | G | | | | | | |
| 210 | 0 | G | | | | | | |
| 211 | 1 | HPOS | S | S | EOSL | G | | |
| 212 | 0 | G | | | | | | |

LEGEND

SYM PRES - 1 INDICATES AT LEAST ONE SYMBOL ON SCAN LINE - 1 BIT

G - GRAPHICS MODE USING MODIFIED READ CODE - VARIABLE BITS

S - SYMBOL CODE - 8 BITS

HPOS - HORIZONTAL POSITION OF SYMBOL - 11 BITS

EOSS - END OF SYMBOL STRING - 8 BITS

EOSL - END OF SYMBOL ON SCAN LINE - 8 BITS

*FIG. 4*

MIXED-MODE SYMBOL REMOVAL FOR FACSIMILE DATA COMPRESSION

GOVERNMENT INTEREST

The invention described herein may be manufactured, licensed and used by or for governmental purposes without the payment of any royalties to the government thereon.

BACKGROUND OF THE INVENTION

1. Field of the Invention

This invention relates to data compression for black-white documents which contain both symbol and graphic portions.

2. Description of the Prior Art a. Digital facsimile systems commonly use compression techniques in order to minimize the number of bits required to fully describe documents. The International Telegraph and Telephone Consultative committee (CCITT) has selected what is known as the Modified READ code as the optional two-dimensional algorithm for Group 3 facsimile equipment. This Modified READ code was subsequently adopted by the Electronic Industries Association on Apr. 3, 1981 as the EIA Standard RS-465. Standards for Group 4 facsimile equipment are currently being developed which will utilize a version of the Modified READ code as the standard data compression algorithm in combination with some form of "mixed-mode" algorithm as an option.

b. Almost all documents which are transmitted are a mix of both symbols and graphics. Modified READ codes will handle both, however, the number of bits required to describe a document containing only symbols is much greater than that required by non-facsimile equipment designed for symbol only transmission. That is, the equipment which is designed for symbol only transmission, such as communicating word processors or some form of Teletex utilize symbol only methods which cannot transmit graphics such as signatures and other non-standard items.

c. Mixed-mode algorithms have the capability of transmitting both symbols and graphics efficiently. Prior art techniques utilizing mixed-mode algorithm include the combined Symbol Matching (CSM) algorithm as well as what is known as the Extended Teletex algorithm.

d. The CSM algorithm which will be referred to hereinafter as the "Symbol Removal/Scan Line" algorithm deals with each symbol on the text on a more or less individual basis with regard to its location. In this particular approach the document is scanned in the normal fashion line-by-line from top-to-bottom and from left-to-right until a group of black pels (picture elements) is encountered which matches a symbol in a stored library. All black pels within the rectangular symbol space are then changed to white and the symbol code and position are recorded. After the symbols have been "removed," the document is re-scanned and the remaining portions are encoded using Modified READ code. The detected symbol codes are inserted before the READ code of the scan line in which the top of the symbol occurs. The presence of a symbol code rather than a READ code, is indicated by a single bit at the beginning of every scan line. If the bit indicates that there are symbols within the particular scan line, an 8-bit symbol code follows. Subsequently and, in turn, this 8-bit symbol code is followed by an 11-bit horizontal position code word, ($2^{11}$=2,048 which is greater than the 1,728 pels in the scan line). This 8-bit symbol is followed by the 11-bit symbol which may be, in turn, followed by an additional symbol/horizontal position code pairs for any other symbols that may have been detected on the scan line in the order of horizontal position. Lastly, the symbol data is terminated by a special 8-bit symbol code which indicates there are no more symbols on the scan line. Following this special symbol code the modified READ code for that particular line is transmitted.

e. In this particular Symbol Removal/Scan Line technique, the recognized symbols will be encoded as they are first encountered by the scanning process regardless of the location of their appearance relative to other symbols or graphics. The vertical position of the symbols is implied from the scan line on which the particular symbol code appears.

f. In the second mixed-mode approach which has recently been proposed and which has been referred to as the Extended Teletex, the entire document is divided into character spaces except for the areas which are defined as being graphics. All character symbols, including blanks, are transmitted using 8-bit symbol codes. The graphics are transmitted by Modified READ code as they occur within a particular line of symbols. The first step in the Extended Teletex method involves a special 8-bit symbol code which is used to designate the transition from symbol codes to graphics. This is followed by an 11-bit code giving the width of the graphics area with the height of the graphics area being defined by the height of the symbol font. Subsequently the modified READ code for the graphic is sent in such a manner that the length of the modified READ code is defined by the width and height of the graphics area so that the transition back to symbol code does not require a separate code.

g. In the Extended Teletex method, instead of transmitting a series of "blank" symbol codes at the right of the symbol line, a special 8-bit code can be designated which performs the carriage-return and line-feed functions. Obviously this special 8-bit code for carriage-return and line-feed must be to the right of any graphics which appear on the particular line. The code designating the last symbol on the line also directs the receiver to start on the next line of symbols.

h. One of the drawbacks with regard to the prior art systems described above is that the symbols must be organized either into lines or else they must be such that each location is conveyed independently of all other locations. Either one of these two requirements reduces the amount of compression which can be accomplished.

SUMMARY OF THE INVENTION

Accordingly, one object of this invention is to provide a novel method for data compression in a digital facsimile document transmission system which operates efficiently for both the symbol and the graphic portions of the document.

Another object of the present invention is to provide a method of data compression which improves the prior art mixed-mode methods by providing that symbols can be located both individually and as a part of a line of symbols so that it is designed to handle both isolated or arbitrarily located symbols and symbol strings in lines or segments.

The objects of the present invention are accomplished by a technique in which, after the symbols are detected and removed and after the codes and positions are recorded, the spaces between symbols up to a value of 2 spaces are filled with appropriate blank characters. According to a further feature of this invention the presence or absence of a symbol code, rather than a Modified READ code, is indicated by a single bit at the beginning of every line scanned.

A horizontal position code (HPOS) indicates the location of the first symbol encountered on a line followed by an 8-bit symbol code for that symbol. Subsequent, contiguous symbols, i.e., those not followed by more than 2 blank symbol spaces, are also indicated by their appropriate symbol code. A special 8-bit symbol code (EOSS) terminates a symbol string which is followed on that line by another symbol string followed in turn by another HPOS which indicates the distance to the next symbol string. The last symbol string in the line is followed by an 8-bit symbol code (EOSL) and lastly the modified READ code for that particular line is transmitted.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows a test document to be transmitted;

FIG. 4 illustrates the composition of a mixed-mode message using the method of the present invention.

DETAILED DESCRIPTION OF THE INVENTION

Figure 2:
FIG. 2 shows the test document residue after removal of all standard symbols.

Referring now to the drawings, wherein like reference numerals designate identical or corresponding parts throughout the several views and more particularly to FIG. 1 thereof, there is shown a test document which will be used to describe the algorithm of the present invention as well as comparing the performance of prior art algorithms of the Symbol Removal/Scan Line type and the Extended Teletex type with the present invention.

FIG. 2 shows the test document residue remaining after each of the symbols have been removed from the test document of FIG. 1. The residue consists of the signature plus certain symbols which were not detected as symbols because they are of a non-standard, or different font than the other symbols.

Figure 3:
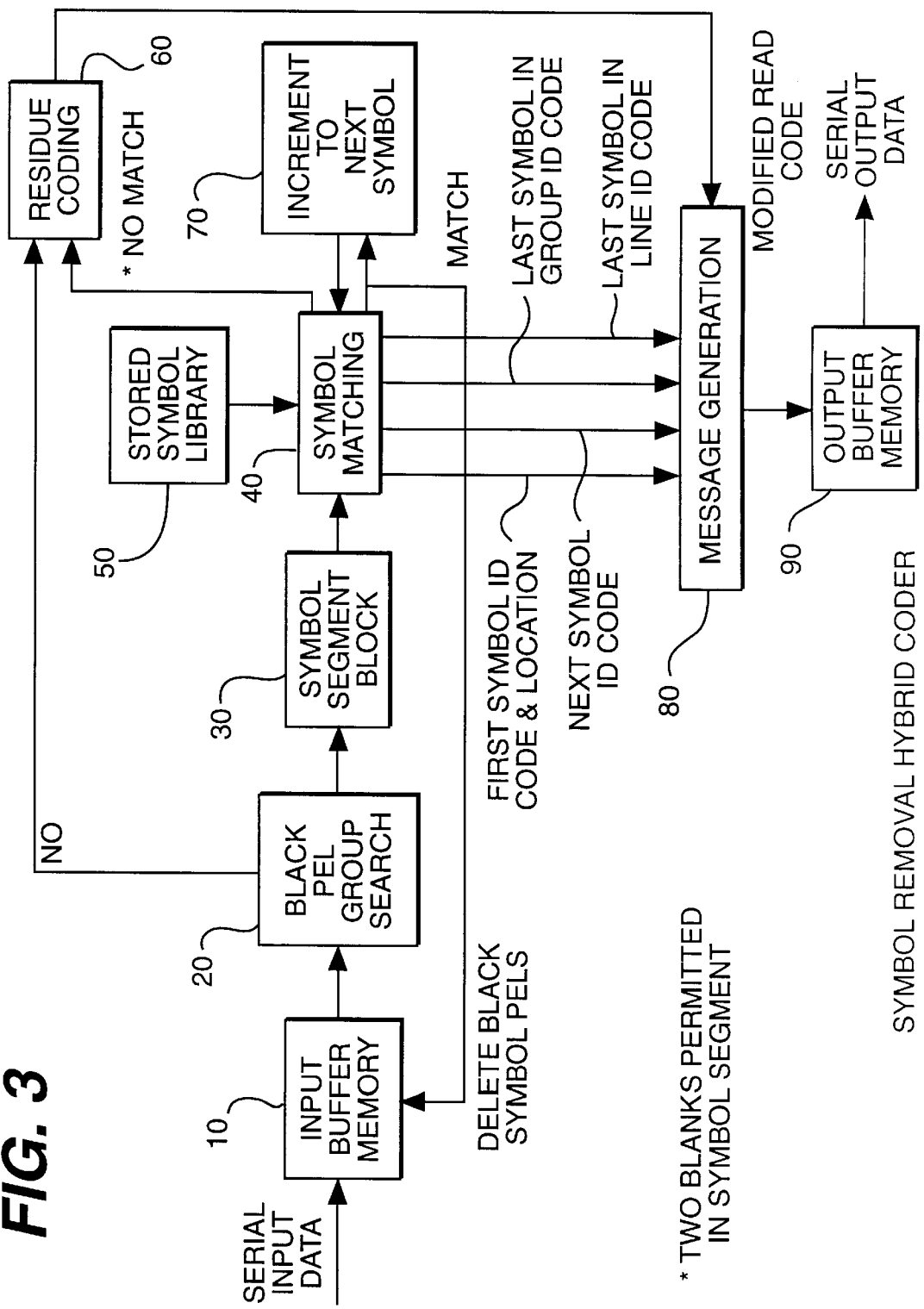
FIG. 3 is a block diagram of the encoder of the present invention.

The technique of the present invention is carried out by means of the Symbol Removal/Hybrid coder of FIG. 3 wherein serial input data is the normal facsimile pel data after the image is scanned from left-to-right and top-to-bottom. The input buffer memory 10 stores a number of scan lines at least equal to the pitch of the symbol font. Starting from the left margin, this data is examined at 20 in order to search and locate a group of black pels. If no grouping if found, the first line of the symbol-pitch high segment is passed to the residue coder 60 and the buffer 10 is scrolled by one line. This process continues until a group of black pels is located. A symbol segment blocking element 30 conducts a symbol segment blocking process to isolate the first symbol of a symbol segment. This isolated symbol is matched in the symbol matching unit 40 against a stored library 50. If no match occurs the process continues. On the other hand, when a match does occur, an identification code for the particular symbol and its location is input to the message generator logic 80 as the first symbol identification code and location. Then the coder is incremented at 70 to the next symbol space. The black picture elements associated with each matched symbol are deleted from the buffer memory 10 as indicated in the FIG. 3.

Assuming a symbol is identified in the next and each succeeding symbol space, its identification code is input to the message generation logic 80. The coder of FIG. 3 permits up to 2 contiguous blank spaces/symbols within a symbol segment. When the last symbol with a segment is encountered, it is followed by a special last symbol identification code and the process continues with the output of the message generator 80 being fed through the buffer 90 to provide serial output data corresponding to the serial input data.

It is to be noted that the detection of the symbols by the input buffer 10 and the black pel group search 20 as well as the removal of the symbols and the symbol matching to provide from the stored symbol library 50 a match as well as the location and identification codes are similar to prior art codes and in particular are similar to the Symbol Removal/Scan Line prior art method which has been otherwise characterized and described above. It is the remainder of the structure with regard to the incrementation and the detection of the symbol either being contiguous or not which provide through Applicants' encoder that the method of the present invention ensures that symbols can be located both individually and as part of a line of symbols.

The operation of the encoder of FIG. 3 on a document such as shown in FIG. 1 functions in the manner shown by the message composition of FIG. 4 wherein a sample of the scanned lines 201 to 212 is shown. It is to be noted that each document contains 2,376 lines at a resolution of 1,728 picture elements per line.

The presence or absence of a symbol code, rather than a Modified READ code is indicated by a single bit at the beginning of every scan line (Sym Pres), which was discussed in conjunction with the output of the message generator 80. A horizontal position code (HPOS) indicates the distance to the first symbol on each scan line which includes symbols (as indicated by the Sym Pres bit). An 8-bit symbol code is then inserted for each symbol in the symbol string. The last symbol code is then followed by either the End of Symbol String code (EOSS) or the End of symbols on Scan Line (EOSL) code. Assuming the EOSS code is used, then it is followed by a HPOS code which indicates the distance to the first symbol in the next symbol string. The last symbol in the last symbol string is followed by the EOSL code. Then, the Modified READ code (G) for that line is transmitted according to the Modified READ code which is applied to the residue of FIG. 3.

The Table 1 lists the results obtained by means of computer simulation for each of the three mixed-mode algorithms previously described including the two prior art algorithms utilizing the Symbol Removal/Scan Line technique (CSM) and the Extended Teletex type of the prior art as well as the present invention which is indicated in the Table as the Symbol Removal/Hybrid technique. These results were obtained though the use of the test document shown in FIG. 1 with the following assumptions being made in determining the compression: a resolution of 1,728 pels/line and 2,376 lines/documents; a stored library; each symbol is encoded using 8-bits; and a Modified READ code is used based on k=infinity and no end-of-line codes.

TABLE 1

COMPRESSION RESULTS FOR FIG. 1 DOCUMENT

| Compression Technique | Bits Required | Compression |
| --- | --- | --- |
| Symbol Removal/Scan Line | 47,497 | 86.4 |
| Extended Teletex | 41,766 | 98.3 |

TABLE 1-continued

COMPRESSION RESULTS FOR FIG. 1 DOCUMENT

| Compression Technique | Bits Required | Compression |
|---|---|---|
| Symbol Removal/Hybrid | 38,635 | 106.3 |
| No Compression (1728 × 2376) | 4,105,728 | 1.0 |

This Table 1, in the left hand column, indicates the compression technique which is used with the center column indicating the number of bits required and the right hand column indicating the compression which is calculated based on the number of bits required when compared with the last line which indicates no compression or in other words a compression of 1 which results from the multiplication of the number of picture elements per line (1,728) by the number of lines per document (2,376). The results in the compression column on the right hand side indicate that the Symbol Removal/Hybrid technique of the present invention which is accomplished by the encoder of FIG. 3 and which has a message composition as detailed, for example, in FIG. 4 provides the highest compression ratio when compared with the prior art techniques of the Symbol Removal/Scan Line and the Extended Teletex of the prior art.

The Tables 2, 3, and 4 indicate the details of the make-up of the various portions of the transmitted document according to each of the prior art techniques in Tables 2 and 3, respectively, and the present invention in Table 4.

It can be seen from the Table 2 that the prior art Symbol Removal/Scan Line technique requires 802 8-bit symbol codes as well as 2,376 bits for allocating a bit to each scan line and 802 11-bit position codes for the horizontal position of the symbol codes. It is also seen that the prior art technique which utilized Symbol Removal/Scan Line needs 194 8-bit end of symbol-start of graphics codes which are necessitated by this prior art technique because of the interface necessary between the end of the symbol and the start of a graphics. Lastly, Table 2 shows the residue such as the graphics and any other non-standard font which must be encoded using the Modified READ code.

TABLE 2

SUMMARY OF THE COMPRESSION ESTIMATE USING
PRIOR ART SYMBOL REMOVAL/SCAN LINE TECHNIQUE

| | Quantity | Bits |
|---|---|---|
| Symbol codes (8 bits) | 802 | 6,416 |
| Symbol present on scan line (1 bit) | 2,376 | 2,376 |
| Symbol Horizontal Position (11 bits) | 802 | 8,822 |
| End of Symbol-Start of Graphics Code (8 bits) | 194 | 1,552 |
| Residue Encoded using Modified READ Code | | 28,331 |
| Compression = $\frac{2{,}376 \times 1{,}728}{47{,}497} = 86.4$ | | 47,497 |

The Table 3 outlines the prior art Extended Teletex technique which requires 1,994 8-bit symbol plus blank code bits. It can be seen in contrast to the technique of Table 2 that the blank codes which are necessary in the Extended Teletex method are significantly increased because of the need for the blank codes. The remaining portions of the Table 3 utilize the bits which are necessary to signify the widths of the codes of graphics and the transfer from symbols to graphics which are unique to the Extended Teletex method.

TABLE 3

SUMMARY OF THE COMPRESSION ESTIMATE USING
PRIOR ART EXTENDED TELETEX TECHNIQUE

| | Quantity | Bits |
|---|---|---|
| Symbols + Blank Codes (8 bits) | 1,994 | 15,952 |
| Symbols to Graphics Codes (8 bits) | 12 | 96 |
| Graphics Width Codes (11 bits) | 12 | 132 |
| CR/LF Codes (8 bits) | 70 | 560 |
| Boxed-in Graphics Encoded using Modified READ code | | 25,026 |
| Compression = $\frac{2{,}376 \times 1{,}728}{41{,}766} = 98.3$ | | 41,766 |

The present invention and its computation of the number of bits to be used as well as the compression ratio is detailed in Table 4 with the message composition of FIG. 4 forming the basis for the items disclosed with regard to the quantity of bits necessary. In particular, with regard to the symbol code plus the blank code number of bits, it can be seen that the present invention significantly reduces the number of symbols plus blank code bits when contrasted with the Extended Teletex technique. This is true because of the ability of the present invention to indicate whether a symbol is contiguous (not followed by more then 2 blank spaces). In other words, the present invention provides for symbol location both individually or as part of a line of symbols thus eliminating the need for either organizing the symbols into lines or conveying each symbol location independently of all others. The results of the Table 4 show a compression of 106.3 for the test document which is a clear improvement over any of the prior art and which is accomplished by utilizing an encoder whose structure, as shown in FIG. 3, utilized many of the same elements as exist with regard to the encoder device necessary for the prior art Symbol Removal/Scan Line technique but which accomplishes a significant improvement in compression as exemplified by the compression of 106.3 of the present invention.

TABLE 4

SUMMARY OF COMPRESSION ESTIMATE USING
SYMBOL REMOVAL/HYBRID TEACHING OF
THE PRESENT INVENTION

| | Quantity | Bits |
|---|---|---|
| Symbol Codes + Blank Codes (8 bits) | 934 | 7,742 |
| Symbol present on scan line (1 bit) | 2,376 | 2,376 |
| Symbol String Horizontal Position Code (11 bits) | 24 | 264 |
| End of Symbol String (8 bits) | 1 | 8 |
| End of Symbol on scan line (8 bits) | 23 | 184 |
| Residue Encoded using Modified READ Code | | 28,331 |
| Compression = $\frac{2{,}376 \times 1{,}728}{38{,}635} = 106.3$ | | 38,635 |

Therefore, Applicants' invention, as disclosed, provides a method which utilizes data compression for a digital facsimile document transmission system which is more efficient than the prior art mixed-mode techniques which either require that the symbols must be organized into lines or that each location must be conveyed independently of all others.

Applicants' invention provides a better compression result due to the fact that the symbols can be located both individually and as a part of a line of symbols. This results in a savings in the number of bits necessary for a transmission of the test document as well as all other documents which therefore leads to the improved compression results.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States:

1. A method for data compression in a digital facsimile document wherein a serial input data is obtained by line-by-line scanning of a document having symbols of a certain font having a certain pitch and graphics which is to be transmitted, comprising the steps of:

a. storing a part of said serial input data corresponding to a number of scanned lines of said document at least equal to the pitch of the font of said symbols;

b. examining said stored part of said serial data starting from a left margin of each scanned line in order to locate a group of black pels;

c. coding by means of a Modified READ code said serial data corresponding to a line containing no black picture element groups;

d. isolating a first symbol of a group of black pels of a scanned line containing at least one group of black pels;

e. comparing said first symbol with a stored library of symbols to determine a match;

f. outputting, when a match has occurred, a first signal indicating a symbol identification code and location, a second signal to increment to a next symbol, and a third signal to delete said matched symbol from said stored input serial data;

g. outputting a non-matched symbol occurring from said step of comparing and repeating said step of comparing until a match has occurred;

h. coding by means of said Modified READ code said non-matched symbols;

i. comparing the next symbol with said stored library and outputting, when a match has occurred, a next symbol identification code wherein a next symbol is located no more than 2 contiguous blank spaces from a previous symbol within said group of black pels and wherein when a last symbol within said group is matched a last symbol within group identification is output, unless said symbol is the last symbol within said line of symbols in which case a last symbol on line identification code is output; and j. generating a message consisting of said first symbol identification code and location, each of said next symbol identification codes, said last symbol in group identification codes and said last symbol on line identification code and the results of both of said Modified READ coding in order to provide a serial output compression data which is a digital facsimile of said document.

2. The method according to claim 1, wherein the symbol code for each of said symbols is an 8-bit code.

3. The method according to claim 1, wherein said first signal indicating a location of said first symbol is a horizontal position code having 11 bits.

4. The method according to claim 1, wherein said last symbol within group identification code and the on line identification code includes an 8-bit symbol code and an 8-bit end of symbols on scan line code, respectively.

5. The method according to claim 1, wherein said output data includes before each symbol code a horizontal position code following said symbol if said symbol is not contiguous.

* * * * *